No. 863,633. PATENTED AUG. 20, 1907.
F. PFEIFER.
CONVERTIBLE MOTOR CAR AND SELF PROPELLED SLEDGE.
APPLICATION FILED DEC. 15, 1905.

Witnesses:
W. Smart
L. Chatwin

Inventor:
Franz Pfeifer.
By J. M. Horschel
Atty.

UNITED STATES PATENT OFFICE.

FRANZ PFEIFER, OF OPPELSHOFEN, GERMANY.

CONVERTIBLE MOTOR-CAR AND SELF-PROPELLED SLEDGE.

No. 863,633.      Specification of Letters Patent.      Patented Aug. 20, 1907.

Application filed December 15, 1905. Serial No. 291,935.

*To all whom it may concern:*

Be it known that I, FRANZ PFEIFER, a subject of the King of Würtemberg, residing at Oppelshofen, Würtemberg, in the Empire of Germany, have invented a new and useful Convertible Motor-Car and Self-Propelled Sledge, of which the following is a specification.

My invention relates to a convertible motor car and self propelled sledge in which all the wheels can be simultaneously lifted off the ground and sledge bars lowered, or vice-versa, while the requisite driving gear is automatically brought into the working position.

I attain these objects by the mechanism illustrated in the annexed drawings, in which:—

Figure 1:
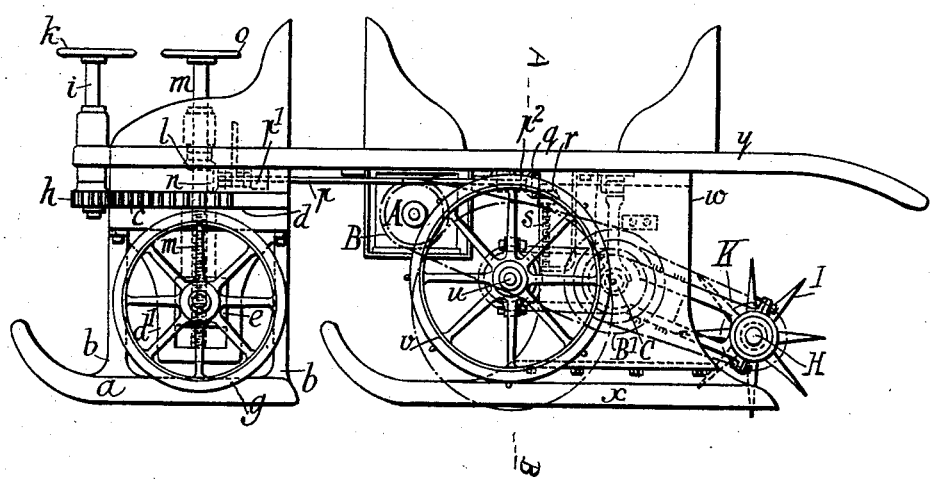
Figure 2:
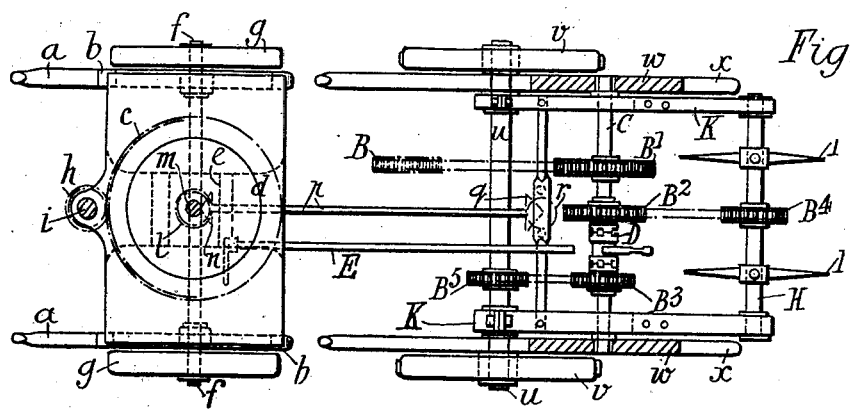

Figure 1 is a side-elevation of the automobile; Fig. 2, is a plan partly in section; and Fig. 3, a cross-section on the line A B of Fig. 1.

In carrying my invention into effect, I employ screw spindles indirectly connected with the front and rear axles and controlled by mutual gear, and I mount the rear axle in a swiveling frame composed of two-armed levers and having for fulcrum the main driving or clutch shaft.

Figure 3:
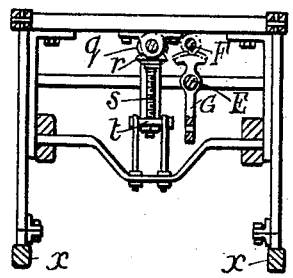

The automobile consists of a fore-carriage with appropriate steering mechanism and seat for driver, and of a carriage body, with suspended motor and driving gear. The fore-carriage carries sledge bars $a$ firmly held by posts $b$ which themselves are rigidly connected with a spur wheel $c$ forming turntable for steering purposes. The wheel $c$ is controlled by a pinion $h$ operated by a spindle $i$ with hand wheel $k$. A screw-spindle $m$ is vertically mounted in the fore-carriage in such a manner as to enable the front wheels to be raised and lowered by turning the hand-wheel $o$ at the upper end of such spindle. The screw portion of the latter engages in internal screw-threads formed in a central block $e$ of the front axle and thus causes such block to be moved vertical in a guide strap $d$ depending from the race $d$. By these means the front axle $f$ and wheels $g$ can be lifted off the ground, or lowered. The spindle $m$ is secured against displacement from the vertical position. On the spindle is fixed a bevel wheel $l$ which gears in a similar wheel $n$ on a horizontal rearward shaft $p$ mounted in bearings $p^1$ and $p^2$ underneath the carriage. The rotary motion of this shaft is transmitted by a pair of bevel wheels $q$ $r$ to a screw spindle $s$ which controls the nut $t$, see Fig. 3, and the rear axle $u$ with the fixed driving wheels $v$. The same number of teeth are provided for both sets of gears $l$ $n$ and $q$ $r$. The carriage body or tonneau is secured by side cheeks $w$ to sledge bars $x$ and is securely connected with the fore-carriage by upper parallel beams $y$. These carry beneath the carriage body a motor A whose chain wheel B transmits motion to a chain wheel $B^1$ fast on a driving shaft C mounted in bearings in the cheeks $w$ and having clutch members D which the driver can throw in and out by means of rods E F G. For this purpose the rod F is fitted with a handle near the driver's seat and with a gear pinion at its rear end to mesh with a toothed quadrant at the upper part of rod G, the latter being pivoted as shown in Fig. 3 and having its forked lower end in engagement with the movable clutch member D. This mechanism imparts rotation alternately to loose chain wheels $B^2$ or $B^3$ on the shaft C, the coupling with $B^2$ being established in connection with the sledge, and the coupling with $B^3$ serving in driving the vehicle when resting on its wheels $g$ and $v$. Under the first conditions, the chain wheel $B^2$, through the intervention of its chain, imparts motion to a chain wheel $B^4$ fast on a shaft H which carries fixed spike wheels I.

When the vehicle is being used as a car, the chain wheel $B^3$ communicates rotation to a chain wheel $B^5$ fast on the rear axle $u$ and so revolves the driving wheels $v$. The shaft H of the spike wheels is journaled in the rear arms and the axle $u$ is journaled in the front arms of the swiveling frame K mounted on the shaft C. The swiveling frame K is connected with the nut $t$ of the screw spindle $s$ by a fixed traverse in such a manner that by the turning of said spindle, the nut $t$ together with the traverse, frame K and wheels $v$ are caused to be raised or lowered with the result that either the wheels or the sledge bars will be in contact with the road.

When the vehicle is chiefly for use as a motor car, it will be advisable to adopt removable sledge bars and to employ divided arms for the swiveling frame so as to allow of these parts together with the spike wheels being readily detached.

What I do claim and desire to secure by Letters Patent of the United States, is:—

In a convertible motor car and self propelled sledge, the combination with the fore and rear carriage, steering gear and motor mechanism, of sledge bars and posts and cheeks for connecting the same to respective parts of the carriage, a main driving shaft journaled in said cheeks, a swiveling frame consisting of two-armed levers mounted in said driving shaft, an axle (with driving wheels) journaled in the front arms, spike wheels journaled in the rear arms of said frame, and clutch mechanism for alternately driving the car wheels or the spike wheels, as and for the purpose set forth.

In testimony whereof I have signed my name to this specification in the presence of two subscribing witnesses.

FRANZ PFEIFER.

Witnesses:
  A. F. BAUER,
  ERNST ENTENMANN.